United States Patent [19]

Ziegenfus et al.

[11] Patent Number: 4,922,831
[45] Date of Patent: May 8, 1990

[54] LIGHTWEIGHT CAR-ON-TRACK SYSTEM

[75] Inventors: Barry L. Ziegenfus, Saylorsburg, Pa.; Russell H. Scheel, Batavia, Ill.

[73] Assignee: Heico Inc., Addison, Ill.

[21] Appl. No.: 213,242

[22] Filed: Jun. 29, 1988

[51] Int. Cl.⁵ ............................................ B61B 13/12
[52] U.S. Cl. .................................... 104/166; 104/246
[58] Field of Search ............... 104/166, 243, 245, 246, 104/168

[56] References Cited

U.S. PATENT DOCUMENTS

| | | | |
|---|---|---|---|
| 3,648,617 | 3/1972 | Metzner et al. | 104/245 X |
| 4,347,792 | 9/1982 | Nagahori | 104/166 |
| 4,359,000 | 11/1982 | Tokunaga | 104/166 |
| 4,367,683 | 1/1983 | Tokunaga | 104/166 |
| 4,498,397 | 2/1985 | Fuchs et al. | 104/166 X |
| 4,532,869 | 8/1985 | Kondo et al. | 104/166 |
| 4,583,462 | 4/1986 | Hale | 104/166 X |
| 4,593,623 | 6/1986 | Gutekunst et al. | 104/166 |
| 4,671,184 | 6/1987 | Fukuda | 104/245 X |
| 4,776,282 | 10/1988 | Ishikura et al. | 104/246 X |
| 4,794,865 | 1/1989 | Lindberg | 104/246 |

Primary Examiner—Margaret A. Focarino
Assistant Examiner—Joseph D. Pape
Attorney, Agent, or Firm—Wood, Phillips, Mason, Recktenwald & Vansanten

[57] ABSTRACT

A lightweight car-on-track system having a pair of spaced-apart rails and an associated rotatable drive tube with a captive carrier movable along the rails and having a drive wheel in driving engagement with the rotatable drive tube. The drive wheel is spring-loaded against the rotatable drive tube and the capture of the carrier to the rails results in a controlled drive force achieved regardless of the weight of the carrier or of a load supported thereon. The system is made up of a selected number of modular units, each having adjustably mounted frame members supporting opposite ends of a rail section and a drive tube section. Adjustable mounting of frame members to an alignment plate assures alignment between rail and drive tube sections when assembling the system. A transfer device is utilized for transferring a carrier from the end of one track section to the spaced-apart end of another track section with the transfer device being oscillatable about a pivot axis. A drive tube for each track section has a generally frusto-conical end extending beyond an end thereof which coact with the drive wheel of a carrier to impart motion of a carrier onto and off the transfer device.

3 Claims, 4 Drawing Sheets

LIGHTWEIGHT CAR-ON-TRACK SYSTEM

DESCRIPTION

Field of the Invention

This invention pertains to a lightweight car-on-track system composed of modular units to provide the desired configuration for material handling and assembly operations. The system has a track with dual rails and an associated rotatable drive tube and a plurality of carriers captured to the rails to provide a constant force of engagement between the driven rotatable drive tube and a drive wheel supported by the carrier whereby the controls for controlling movement of the carrier are simplified because of uniform drive force between the drive wheel and drive tube regardless of the weight of the carrier and the load on the carrier. The carrier can carry loads which extend beyond the periphery of the carrier. The system enables installation in many various configurations to suit the requirements for material handling or flexible assembly operations and includes provision for transfer of carriers from one track to another including an over and under system wherein a carrier can travel continuously forward along superimposed tracks.

BACKGROUND OF THE INVENTION

Car-on-track systems have been extensively used in the automobile industry as well as in other industries wherein materials must be transported from point to point. Additionally, car-on-track systems are used in assembly operations wherein a component supported on a carrier movable along the track may stop at one or more stations for assembly of parts to the component.

The basics of a car-on-track system are shown in the Gutekunst et al. U.S. Pat. No. 4,593,623, owned by the assignee of this application. The patent shows a carrier having rollers which movably support the carrier on a pair of spaced-apart rails. Movement of the carrier is derived from a rotatable drive tube extending along the track and which coacts with a drive wheel depending from the carrier and which is spring-loaded into engagement with the drive tube. As well known in this art, linear movement of the carrier is determined by the angle of the drive wheel relative to the rotatable drive tube. When the axis of rotation of the drive wheel is parallel to the axis of rotation of the drive tube, there is no linear movement of the carrier and there can be movement in either forward or reverse direction depending upon the canting of the drive wheel relative to the drive tube.

The Gutekunst et al. patent also shows accumulation means whereby a carrier will be caused to stop if, in its movement, a rod of the accumulation means contacts a preceding carrier.

A particularly unique utilization of basic concepts utilized in a car-on-track system, such as disclosed in the Gutekunst et al. patent referred to above, is shown in the Gutekunst et al. U.S. Pat. No. 4,648,325, owned by the assignee of this application. The last-mentioned patent shows a linear drive unit having a carriage with a plurality of drive wheels engageable with a drive tube, with the carriage being usable as a substitute for a hoist or other track-mounted conveying element. This patent shows the use of acceleration and deceleration cams for controlling the canting of the drive wheels relative to the drive tube as the carriage moves between a full-speed and stopped conditions.

In the car-on-track system disclosed in the first-mentioned Gutekunst et al. patent, the force of the spring acting to urge the drive wheel against the drive tube is reacted to the carrier and, thus, the carrier and the load supported thereby must have sufficient weight to hold the carrier onto the track rails against the force of the spring. This dictates that the carrier must have substantial weight, if the load is to be a light load, with such a carrier being more bulky and expensive because of its size and, therefore, increasing the cost of the system which will utilize many carriers.

There are also various known mechanisms for transferring a car or carrier between tracks having adjacent spaced-apart ends, with such structures including a turntable, as shown in the Jones U.S. Pat. No. 4,059,053; a shuttle car, as shown in Ziegenfus et al. U.S. Pat. No. 4,132,174; and a pivotally-mounted oscillatable member, as shown in Berk et al. U.S. Pat. No. 4,389,941. All of these patents disclose some form of drive tube on the transfer device for advancing a carriage or car onto the device and for discharging the carriage or car off the device and with the drive tube either deriving rotation from the drive tube of a track or from a motor mounted on the transfer device. An improvement disclosed in this application relates to the use of transfer devices which do not require any form of drive tube on the transfer device and which rely on carrier drive wheel contact with extensions of the drive tubes for moving the carrier onto the transfer device and for discharge of the carrier from the transfer device. Additionally, this feature is uniquely used in an over and under transfer system wherein there are a pair of superimposed tracks and a transfer device pivots about a horizontal axis to transfer a carrier from the upper track to the lower track for continuous forward travel of the carrier in returning to a starting point.

SUMMARY OF THE INVENTION

A primary feature of the invention is to provide a lightweight, car-on-track system having captured carriers associated with the track whereby there is a controlled drive force between a rotatable drive tube and a downwardly spring-urged drive wheel supported by the carrier. The controlled drive force is constant regardless of the weight of the load supported by the carrier and without requiring any minimum weight for the carrier, with resulting simplification of the controls for controlling movement of the carrier. As a result, the car and track system can be lighter and built at a lesser cost than prior known car-on-track systems.

Another feature of the invention relates to the modular construction of the car-on-track system, whereby standard components can be manufactured and assembled into modular units and the necessary number of modular units can be selected and assembled together to provide a desired car-on-track system with resulting economies in manufacture and inventory control.

Still another feature of the invention is the provision for transfer of a carrier from one track to another by an extremely simple form of transfer device not requiring any structure on the transfer device for imparting movement to a carrier that is on the transfer device and with the transfer device being of a type either to transfer a carrier between tracks on the same horizontal level or between superimposed tracks whereby the carrier can be transferred from an upper track to a lower track while travelling in the same forward direction along both tracks for return to a starting point. This unidirectional travel enables the use of a simpler accumulation device, since it is necessary to only have accumulation means which will extend outwardly in one direction from the carrier for sensing a preceding carrier, as distinct from carriers which have two-way travel along a track wherein accumulation components must extend from both ends of the carrier.

An object of the invention is to provide a lightweight car-on-track system having a pair of elongate spaced-apart parallel rails, a rotatable drive tube extending lengthwise of said rails, at least one carrier movable along said rails, at least one drive wheel on said carrier engageable with the rotatable drive tube, means urging the drive wheel against the drive tube and mounting the drive wheel for pivoting to change the angle thereof relative to the drive tube, the improvement comprising, means capturing the carrier onto the rails whereby the carrier cannot move in a direction normal to the length of the rails whereby the force urging the drive wheel against the rotatable drive tube remains constant regardless of the weight of a load on the carrier.

Still another object of the invention is to provide a car-on-track system comprising, first and second track means each having an end with the ends in adjacent spaced relation, a pair of rotatable drive tubes associated one with each track means and terminating in a generally frusto-conically-shaped end extending beyond said end of the associated track means, at least one carrier movable along said track means and having a pivotally-mounted drive wheel spring-loaded into engagement with one of said rotatable drive tubes to impart linear movement of a carrier along the associated track means, and pivotally-mounted means oscillatable about a pivot axis for receiving said carrier from one track means and transferring the carrier to the other track means, said pivot axis being oriented relative to the track means and rotatable drive tubes whereby the carrier drive wheel moves off the generally frusto-conically-shaped end of one drive tube and onto the generally frusto-conically-shaped end of the other drive tube in the transfer movement of the carrier between the track means.

An additional object of the invention is to provide a car-on-track system as defined in the preceding paragraph wherein the track means are in superimposed relation and the pivot axis for the pivotally-mounted means is horizontal.

A further object of the invention is to provide a lightweight car-on-track system comprising a length of spaced-apart rails for support of carriers movable therealong, a rotatable drive tube extending lengthwise of the spaced-apart rails for powering movement of a carrier along the rails, and a supporting frame structure, the improvement comprising, a modular construction with a modular unit having a pair of generally U-shaped transverse frame members supporting sections of said spaced-apart rails adjacent rail section ends and also mounting bearings for supporting a section of said drive tube adjacent opposite ends of the drive tube section whereby any number of modular units can be assembled in end-to-end relation to form a desired overall length for all or part of the system.

DESCRIPTION OF THE PREFERRED EMBODIMENT

Figure 1:
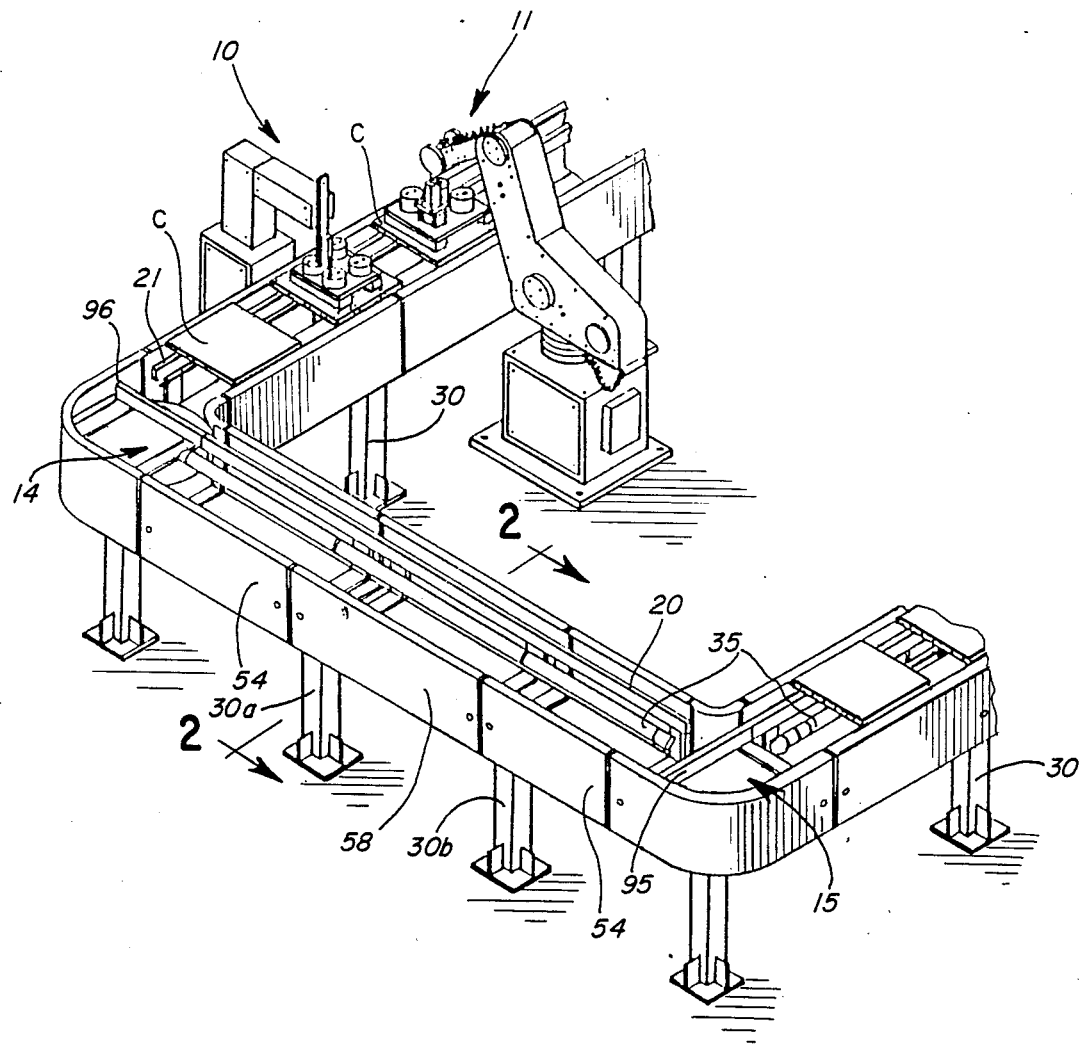
FIG. 1 is a fragmentary perspective view of the lightweight car-on-track system as used in an assembly operation.
Figure 8:
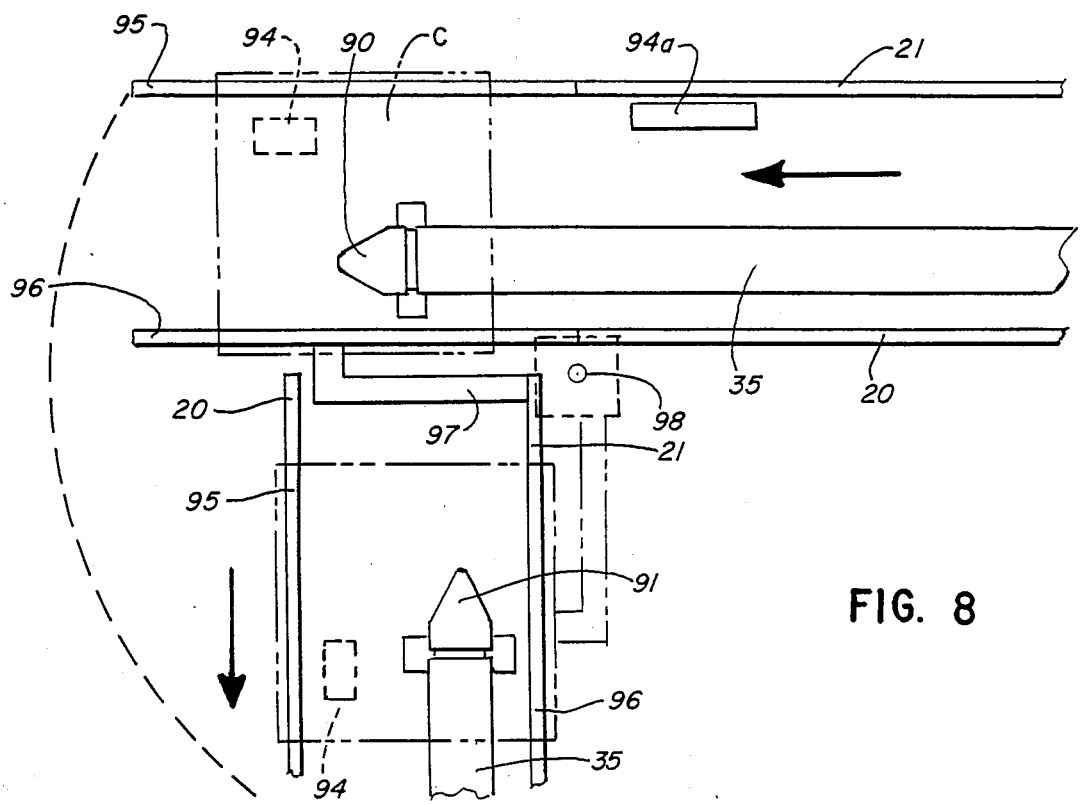
FIG. 8 is a diagrammatic view of a car-on-track system showing a second embodiment of transfer device.

The lightweight car-on-track system is illustrated generally in FIG. 1 as used in a manufacturing process wherein a number of spaced-apart carriers C are shown mounted for movement along a generally U-shaped path, with an additional part of the system extending beyond the legs of the illustrated U-shaped path. A pair of the carriers C are shown stopped at work stations, indicated generally at 10 and 11. At these stations, work devices can perform operations on parts supported on the carriers. In order for the carriers C to move along the illustrated path, a pair of transfer devices, indicated generally at 14 and 15, receive a carrier and rotate the carrier 90° for movement onto the next right-angular extension of the travel path. A diagrammatic illustration of this operation of a transfer device is shown in FIG. 8.

Figure 2:
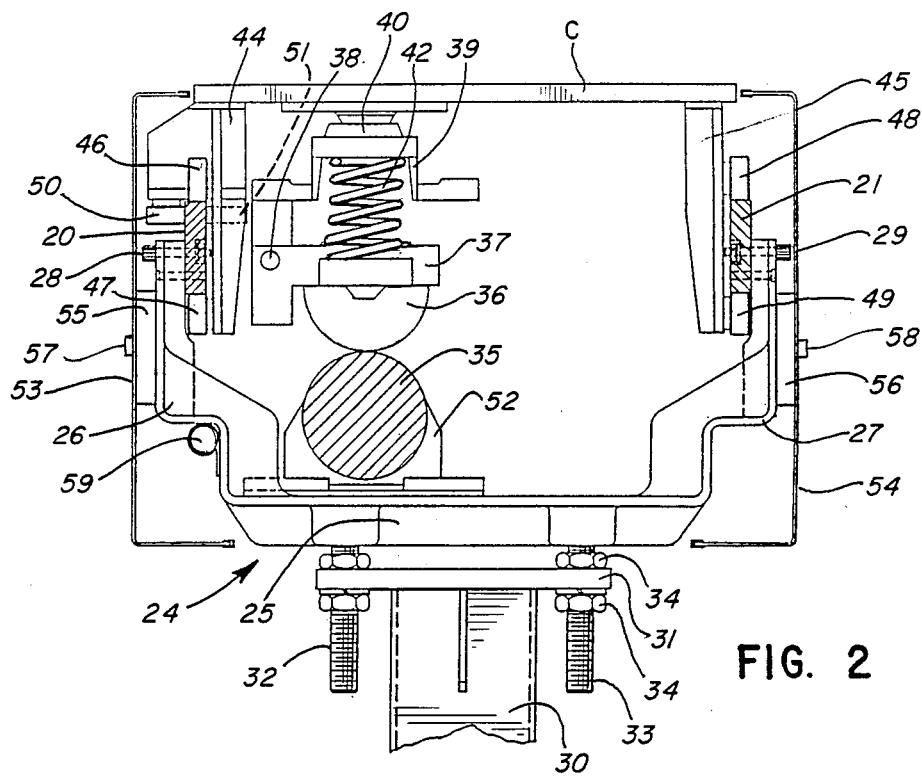
FIG. 2 is a fragmentary vertical section on an enlarged scale, taken generally along the line 2—2 in FIG. 1.
Figure 3:
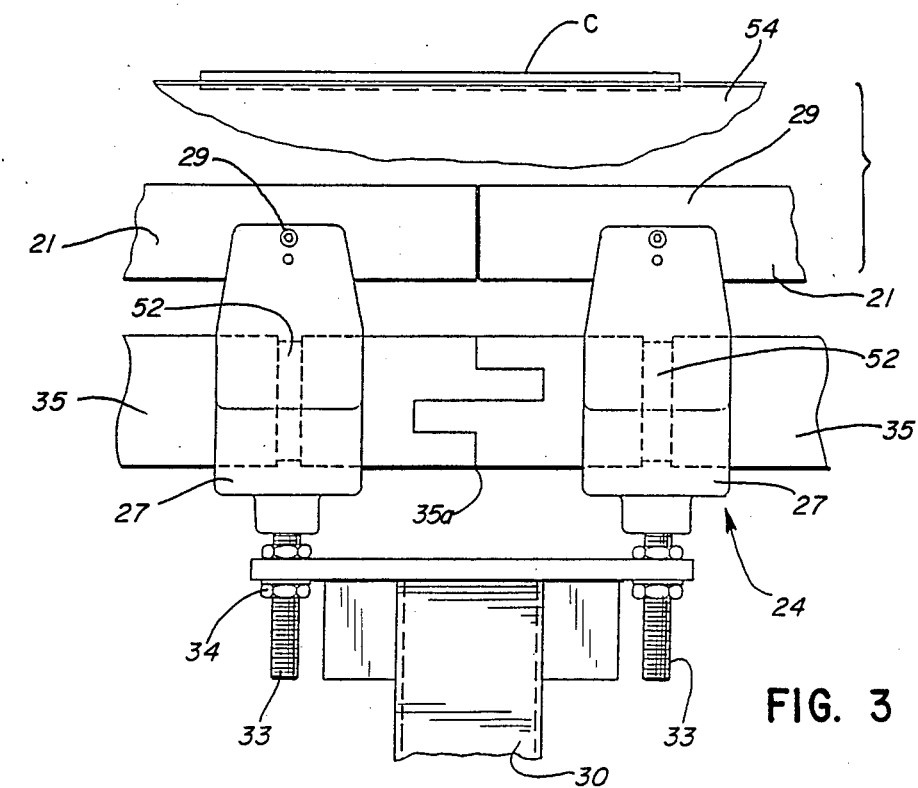
FIG. 3 is a fragmentary elevational view, looking toward the right-hand side of FIG. 2 and with a side panel broken away.

Each straight section of the track has a construction, as shown in FIGS. 2 and 3. A pair of spaced-apart elongate rails 20 and 21 are mounted to a generally U-shaped frame, indicated at 24, and which has a base 25 and a pair of upstanding side members 26 and 27. The rails 20 and 21 are secured to the side members 26 and 27 by suitable threaded members 28 and 29. The frame member 24 is shown as supported above a support surface by a column 30 having a plate 31. The frame member is adjustably mounted to the plate 31 by having a pair of threaded members 32 and 33 depending therefrom and extending through openings in the plate and with adjustable nuts on the threaded members positioned above and below the plate 31 whereby in a known manner the nuts 34 can be adjusted lengthwise of the threaded members for both height and tilt adjustment of the frame member to assure that the rails 20 and 21 are at the appropriate height and are level. Referring back to FIG. 1, it will be noted that the columns 30 are spaced apart along the sections of the travel path. There is a plate 31 associated with each column and the plate has four precisely located openings for accurate assembly of modular units, to be described.

A rotatable drive tube 35 extends lengthwise of the track sections and, as well known in the art, is power-driven to provide a means for imparting linear movement to the carrier C. The drive tube 35 is conventionally made of predetermined lengths of drive tube section which can be joined as seen at 35a in FIG. 3.

The linear movement of the carrier is derived from a drive wheel having a construction and mounting as shown in the previously referred to Gutekunst et al U.S. Pat. No. 4,593,623 and the disclosure thereof is incorporated by reference. The drive wheel 36 is pivotally supported by a pivoted arm 37 pivoted at 38 to a mounting support 39 which is pivotally mounted to the underside of the carrier at 40. When the drive wheel 36 has its rotation axis parallel with the rotational axis of the rotatable drive tube 35, no linear movement is imparted to the carrier C. When the drive wheel 36 is moved to a canted position by pivoting at the pivot mount 40 to have the rotation axis of the drive wheel at an angle to the rotation axis of the drive tube, there is then a component of linear movement imparted to the carrier C.

A spring 42 captured between the mounting bracket 39 and the pivoted arm 37 urges the pivoted arm downwardly and the drive wheel 36 against the rotatable drive tube 35 to have the drive wheel downwardly spring-urged against the rotatable drive tube with sufficient force to assure a nonslipping rotatable relation between these components.

Figure 7:
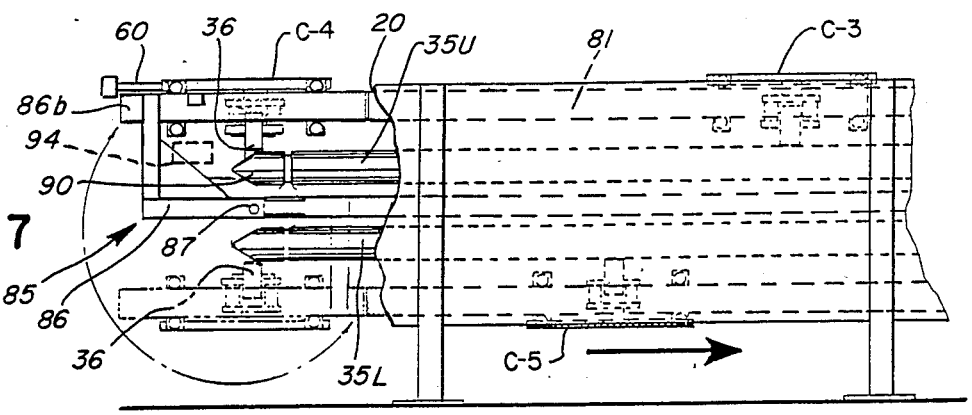
FIG. 7 is a front elevation view of the structure shown in FIG. 6.

In order to provide a constant controlled drive force between the drive wheel and the rotatable drive tube independent of the weight of the carrier and the weight of the load supported thereon, the carrier C is captured on the rails to prevent any movement normal to the length of the rails 20 and 21 and particularly to prevent any movement of the carrier C upwardly as viewed in FIG. 2 and, thus, avoid any reduction in the force applied by the spring 42. This capture of the carrier C is achieved by having downwardly depending arms positioned generally at the four corners of the carrier, each of which mount a pair of rollers engaging upper and lower surfaces of the rails. More particularly, as seen in FIG. 2, a pair of depending arms 44 and 45 at two corners of the carrier each mount a pair of rollers with the arm 44 having a roller 46 engaging the upper surface of the rail 20 and a roller 47 engaging the lower surface of the rail 20. The arm 45 has an upper roller 48 engaging the upper surface of the rail 21 and a lower roller engaging the lower surface of the rail 21. There are two more arms at the other corners of the carrier and which mount similar rollers, as seen in FIG. 7. This precludes any movement of the carrier C normal to the length of the rails 20 and 21. In initial assembly, the carriers C can be moved lengthwise of the rails for placement of the rollers in association with the rails and, if the system is a continuous loop, the carriers can be placed in association with the rails before the final track section is positioned to close the loop.

Additionally, lateral guidance of the carrier is achieved by the pair of depending arms at one side of the carrier, such as the arm 44 having a pair of rollers 50 and 51 rotatable about vertical axes and positioned to engage opposite sides of the rail 20.

With the captured carrier there is a controlled drive force between the drive tube 35 and the drive wheel 36 and this drive force is constant, regardless of the weight of the carrier C as well as regardless of whether or not there is a load on the carrier and the weight of the load. This provides considerable benefit in the control of the movement of the carrier C, as illustrated subsequently in connection with FIGS. 4 and 5. Additionally, the stability imparted to the carrier C by being captured enables the support of irregularly-shaped loads which can even have part thereof extending outwardly of the sides of the carrier and outwardly of the vertical planes of the rails 20 and 21.

The lightweight car-on-track system disclosed is of modular construction whereby a system to be installed can be composed of modular units to achieve desired contours and lengths of the travel path and, because of the modularity, manufacture of the components is simplified and inventory requirements are reduced. This modular construction is illustrated in FIGS. 1 to 3. A modular unit has a pair of the frame members 24 positioned at a distance apart, for example, approximately six feet, since this can be a typical length for a section of the drive tube 35 and, as previously pointed out, adjacent drive tube sections can be joined at 36. The pair of frame members of adjacent modular units would be secured to a plate 31 of a column 30, as illustrated in FIG. 3. Additionally, the track rails are of modular length sections approximately equal to the length of the drive tube sections wherein, as seen in FIG. 3, a pair of rail sections 21 are in abutting relation and are supported by the frame members near their ends. The modular units are accurately assembled in end-to-end relation by a controlled orientation of components derived from the attachment of the rail sections to the frame members and the mounting of the threaded members 33 extending from the frame members through the openings in the plate 31. Additionally, each frame member mounts a pillow block bearing 52 for rotatable support of a drive tube section adjacent an end thereof.

A modular unit also has a pair of enclosing side panels 53 and 54 which substantially enclose the structure and extend from the level of the carrier C down to the underside of the frame member 25. Side panels are supported from the side members 26 and 27 of a frame member and spaced therefrom by spacers 55 and 56 and attached thereto by members 57 and 58. Each modular unit also mounts a length 59 of conduit (FIG. 2) to simplify the installation of control wiring when assembling the system.

Figure 4:
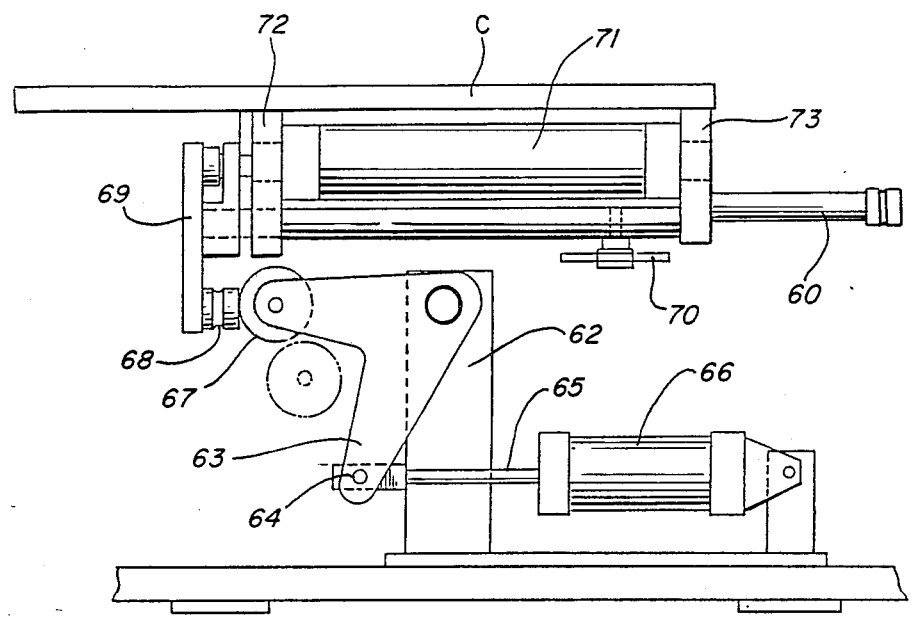
FIG. 4 is a fragmentary side elevational view showing the stop means for stopping a carrier at a station.
Figure 5:
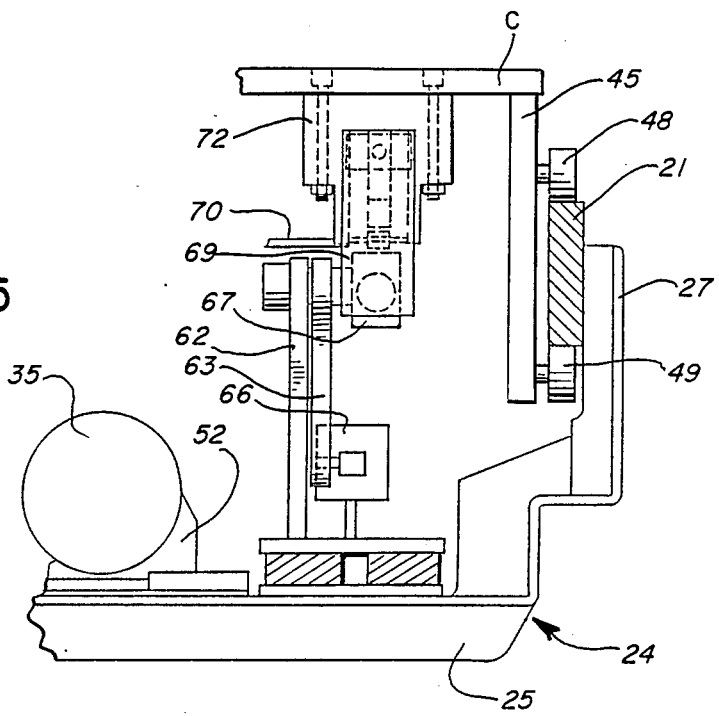
FIG. 5 is a elevational view looking toward the left-hand side of FIG. 4.

An improvement in the control of the captive carrier C is illustrated in FIGS. 4 and 5 wherein stop means are provided for stopping a carrier C at a work station, such as the work stations 10 and 11 shown in FIGS. 1.

The control is achieved by structure associated with conventional accumulation means for a carrier.

The accumulation means is generally of the type shown in Gutekunst et al. U.S. Pat. No. 4,593,623 and the disclosure thereof is incorporated by reference. The accumulation means includes an accumulation rod 60 which extends outwardly and forwardly of the carrier C which would be travelling toward the right as viewed in FIG. 4. The accumulation means functions to bring the drive wheel 36 to the position shown in FIG. 2 whereby no linear movement is imparted to the carrier. The normal use of the accumulation means is to bring a moving carrier to a stop when the accumulation rod 60 is moved toward the left, as viewed in FIG. 4, by contact with a preceding carrier.

The stop means at a work station operates to shift the accumulation rod 60 in a manner similar to the action that would occur if the accumulation rod were shifted by contacting a preceding carrier. The system is designed for travel of the carrier C in only a forward direction and, therefore, the accumulation rod 60 only needs to extend outwardly and forwardly of the carrier as distinct from an accumulation means wherein the carrier can travel in both forward and reverse directions and which requires extension of the accumulation rod both forwardly and rearwardly of the carrier, as shown in the referred to Gutekunst et al. patent.

The stop means includes an upstanding plate 62 supported by frame member 24 and which pivotally mounts a bell crank 63 having one arm thereof pivoted at 64 to an end of a piston rod 65 of a cylinder 66. Controlled operation of the cylinder 66 can cause a stop roller 67 mounted at the end of the other arm of the bell crank 63 to be either in the full line position shown or a lowered broken line position. In the full line position, the roller 67 is positioned to engage a bumper 68 supported by a plate 69 which is connected to an end of the accumulation rod 60. The initial engagement between the bumper and the roller is shown in FIG. 4 and, as the carrier C moves further to the right, the accumulation rod 60 will be retracted from the position shown and such movement will cause the drive wheel 36 to move to a neutral nondriving position. The accumulation rod 60 is connected through a linkage to the mounting bracket 39 for the drive wheel with a part of the linkage being shown at 70. The pneumatic cylinder 66 is connected into a control circuit to provide for controlled raising and lowering of the roller 67, with lowering of the roller 67 after completion of work at a work station and also for selective control of a carrier either passing the station or stopping at the station. Alternatively to the use of a pneumatic cylinder, the bell crank 63 could be rotatably positioned by operation of a solenoid.

The accumulation rod 60 is normally urged to the extended position, as shown in FIG. 4, and this urging can be accomplished by a spring or preferably by a dashpot device, as shown at 71, which is supported on the underside of the carrier by a pair of brackets 72 and 73 fixed to the carrier. The dashpot device provides controlled movement of the accumulation rod for controlled acceleration and deceleration of a carrier and, therefore, cams need not be used for this purpose.

Figure 6:
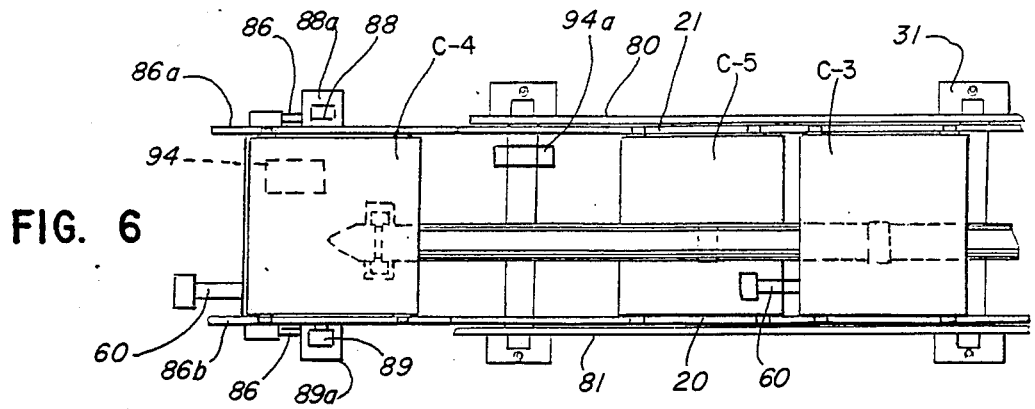
FIG. 6 is a fragmentary plan view of a car-on-track system showing an over and under transfer device.

A unique arrangement for the lightweight car-on-track system is illustrated in FIGS. 6 and 7 wherein carriers C-3 and C-4 have travelled from right to left on the upper track of a superimposed upper and lower track system. A third carrier C-5 is shown travelling to the right while moving along the lower track for return to a starting location. With this arrangement, the carriers are always going in a forward direction so that the previously referred to accumulation rod 60 only has to extend forwardly of each carrier.

Each of the upper and lower tracks is of the same basic construction as shown in FIGS. 2 and 3, with each track section having the rails 20 and 21 and a rotatable drive tube 35 for engagement by drive wheels 36 of the carriers. Each track has side panels or, alternatively, side panels 80 and 81, mounted similarly to the side panels 53 and 54 shown in FIG. 2, can have a greater height in order to substantially enclose both the upper and lower track. As seen in the elevational view of FIG. 7, carriers C-3 and C-4, which have travelled from right to left, have the drive wheel 36 engaging the upper rotatable drive tube 35U along an uppermost surface thereof while, as shown for carrier C-5 returning on the lower track, the drive wheel 36 engages the lowermost surface of the lower rotatable drive tube 35L. The upper and lower drive tubes 35 rotate in opposite directions.

The movement of the carrier C-4 from the upper track to the lower track is achieved by an over and under pivotal transfer device, indicated generally at 85, which has arms 86 pivoted for oscillating about a horizontal axis. The transfer device arms 86 pivot about an axis 87 as defined by a mounting shaft mounted in frame-supported bearings 88 and 89 at opposite sides of the transfer device. The bearings 88 and 89 are suitably supported from the floor by posts 88a and 89a. The arms 86 mount rails 86a and 86b which align with the rails 20 and 21 of the upper and lower tracks.

The carriers are caused to move off the upper track section onto the transfer device and off the transfer device onto the lower track section by linear movement derived from the upper and lower rotatable drive tubes 35U and 35L. The transfer device does not have any drive tube structure mounted thereon for coaction with the drive wheel 36 of the carrier. The transfer action is achieved by having each of the drive tubes provided with a generally frusto-conical end 90 and 91, respectively, whereby, when the carrier C-4 reaches a stop position on the transfer device shown in full line in FIG. 7, the drive wheel is in a neutral nondrive position and, as the transfer device pivots counterclockwise about the pivot axis 87 to move the carrier C-4 to the lower broken line position, the drive wheel is caused to leave the generally frusto-conical end 90 of the upper drive tube 35U and move onto the frusto-conical end 91 of the lower drive tube 35L. The latter movement is sufficient whereby, when the drive wheel 36 is canted from its neutral, nondriving position, linear movement of the carrier will commence. As known in the art, it is important to assure that the carrier C-4 be retained in position on the transfer device during movement thereof, such as has occurred in turntables in the past, and, therefore, a mechanism, indicated generally at 94, is mounted on the transfer device and has mechanical components under suitable electrical control to positively lock the carrier in position during transfer and for release of the carrier once the carrier is in its lower position ready to commence travel on the lower track. This mechanism also acts to control the angle of the drive wheel 36 to stop and start linear movement of the carrier on the transfer device and can be a movable cam bar to bring the drive wheel to neutral and which is controlled to permit movement of the drive wheel back to a linear drive position. These controls include sensing the position of a carrier and the transfer device. A device, indicated at 94a, operates, as known in the art, to stop a carrier on the upper track when the transfer device is not positioned to receive it.

A variation of the transfer device using the same principle for obtaining movement of a carrier on and off thereof is illustrated in FIG. 8 wherein the transfer device has laterally spaced rails 95 and 96 supported by an arm structure 97 pivoted at 98 with a pivot shaft connected to a suitable reversible drive mechanism whereby the rails can move from a position receiving a carrier moving from right to left in the Figure and transfer the carrier to a position where it aligns with rails 20 and 21 of a track section extending at right angles to the first-mentioned track section. This transfer device can be oscillated by a hydraulic cylinder connected thereto.

A carrier C is held in position on the transfer device by the lock-up mechanism indicated at 94 and the drive wheel thereof moves off of one drive tube and onto the other in a manner similar to that described in the embodiment of FIGS. 6 and 7. In both embodiments of transfer device, a carrier is received from the end of one track section and moved onto the rails of an adjacent track section, with the track sections having their ends spaced apart.

Although the disclosed lightweight car-on-track systems are shown as floor-mounted, it will be evident that with suitable change in the support structure the system could be suspended from the ceiling or mounted to a side support whereby the carriers would extend in a vertical plane during their travel along the tracks.

The system is extremely compact and modular and can be built of lightweight materials, with the carrier being formed of a lightweight material, such as aluminum, since there is no requirement for weight to maintain the drive relation between the drive wheel and the drive tube. Although each carrier is shown as having only a single drive wheel, it will be obvious to one skilled in the art that two or more drive wheels can be associated with a carrier and will operate simultaneously in movements between drive and neutral nondriving positions. Because of the controlled drive force achieved between the drive wheel and the rotatable drive tube, it is not necessary to have the conventional acceleration and deceleration cams nor an extremely long accumulation rod, as known in the prior art, and the dashpot 71 is adequate for control of acceleration of a carrier as it leaves a work station.

We claim:

1. A lightweight car-on-track system having a pair of elongate spaced-apart parallel rails having upper and lower guide surfaces, a rotatable drive tube extending lengthwise of said rails, at least one carrier movable along said rails, at least one drive wheel on said carrier engageable with the rotatable drive tube, means for biasably urging the drive wheel relative to said carrier downwardly against the drive tube so that the drive wheel is driven by the drive tube and the biased drive wheel produces an upward force tending to elevate the carrier on said parallel rails and for mounting the drive wheel for pivoting to change the angle thereof relative to the drive tube, the improvement comprising, means for maintaining a constant bias force from said drive wheel on said drive tube regardless of the weight of said carrier so that said carrier is consistently and positively driven along said rails, said maintaining means including a plurality of vertically spaced-apart guide rollers fixedly mounted to the carrier at opposite sides thereof to have plural guide rollers engage both the upper and lower guide surfaces of both rails for capturing the carrier onto the rails whereby the carrier cannot move in a vertical direction normal to the length of the rails.

2. A lightweight car-on-track system as defined in claim 1 including accumulation means on said carrier actuable by a preceding carrier to cause said drive wheel to move to a neutral nondriving stop position for the carrier when the carrier reaches a position adjacent said preceding carrier, and selectively operable stop means at a station along said parallel rails for operating said accumulation means to stop said carrier.

3. A lightweight car-on-track system as defined in claim 2 wherein said selectively operable stop means at a station comprises a pivoted stop movable into the path of a member associated with the accumulation means.

* * * * *